June 10, 1930.  E. E. FREY  1,763,040
STAPLING MACHINE
Filed June 23, 1927   7 Sheets-Sheet 1

INVENTOR
Elmer E. Frey
BY
ATTORNEY

June 10, 1930.  E. E. FREY  1,763,040
STAPLING MACHINE
Filed June 23, 1927  7 Sheets-Sheet 2

INVENTOR
Elmer E. Frey
BY
ATTORNEY

June 10, 1930.     E. E. FREY     1,763,040

STAPLING MACHINE

Filed June 23, 1927     7 Sheets-Sheet 3

INVENTOR
Elmer E. Frey,
BY
ATTORNEY

June 10, 1930.  E. E. FREY  1,763,040
STAPLING MACHINE
Filed June 23, 1927   7 Sheets-Sheet 6

INVENTOR.
Elmer E. Frey
BY
ATTORNEY.

Patented June 10, 1930

1,763,040

UNITED STATES PATENT OFFICE

ELMER E. FREY, OF LOS ANGELES, CALIFORNIA, ASSIGNOR TO JOHN P. MEEHAN AND EDWARD F. LEONARD, BOTH OF LOS ANGELES, CALIFORNIA, DOING BUSINESS AS LEONARD MACHINERY COMPANY

STAPLING MACHINE

Application filed June 23, 1927. Serial No. 201,007.

This invention relates to book stapling machines and the principal object is to provide generally a highly simplified and improved machine for stapling booklets and the like, so designed and arranged that the stapling operations may be greatly facilitated and substantial economies effected over obtaining methods and machines.

An important object is to provide improved wire feeding, forming, cutting, driving and clinching means cooperatively arranged for accurately forming staples of uniform length, together with means for commonly adjusting said elements for varying the length of wire cut and staple formed and clinched at each operation, to correspond to the varying thickness of books desired to be stapled.

Another object is to provide a rotary cutter for the wire, so mounted and disposed with respect to the wire that the cutter will make rolling contact with the wire in a cutting operation, through a shearing action, and present different portions of the cutter to the successive portions of wire, thus lengthening the life of the cutter over that of commonly used reciprocating cutters.

A further object is to provide a wire feeding mechanism arranged to positively feed the wire at intervals to stapling position, in uniform lengths, and readily capable of adjustment for varying the length of wire for the staples.

It is also an object to provide an improved and accurate forming device whereby the sections of wire cut for the staple may be neatly and accurately formed while positively held in suitable guides, preparatory to a driving operation, together with improved means for driving the staples through a substantial number of signatures, and for clinching and bending the ends of the staples upwardly, at the completion of an operation.

A still further object is to provide a novel and efficient form of stapling table for supporting and holding the work during a stapling operation, and capable of adjustment to horizontal and angular planes, at will, for flat and saddle stitching.

Other and more detailed objects of invention will appear as the description of my invention progresses.

I have shown a preferred form of invention in the acompanying drawings, subject to modification within the scope of the appended claims, without departing from the spirit thereof.

In said drawings:

Fig. 16 is a front view of the clincher head with matter to be stapled in position thereabove, during a clinching operation.

Fig. 17 is a side elevation of the same.

Fig. 18 is a top plan view of the clincher head.

Figs. 19 and 20 are enlarged sectional elevations of the clincher head, on line 19—19 of Fig. 18, during and at the completion of a clinching operation, respectively.

Fig. 21 is an enlarged front elevation of the lower portion of the forming and driving head, with a wire positioned therein preparatory to a cutting operation, and means for retaining the wire in the former after said operation.

Figs. 21$^a$ and 21$^b$ are sectional plans of the driving and forming head on lines $a$—$a$ and $b$—$b$, respectively, of Fig. 25.

Fig. 22 is a section of the same on line 22—22, and Fig. 23 is a similar section on line 23—23 of Fig. 21, showing details of the wire retainer.

My machine is constructed and designed, in general conformity to machines now in use for similar purposes, and embodies many well known and generally used expedients. It is, however, materially different with respect to the particular features hereinbefore mentioned in the objects of invention and includes substantial improvements over the art which have proven to be expeditious and economical in time and labor, in stapling work.

Figures 1, 2, 3, 4:
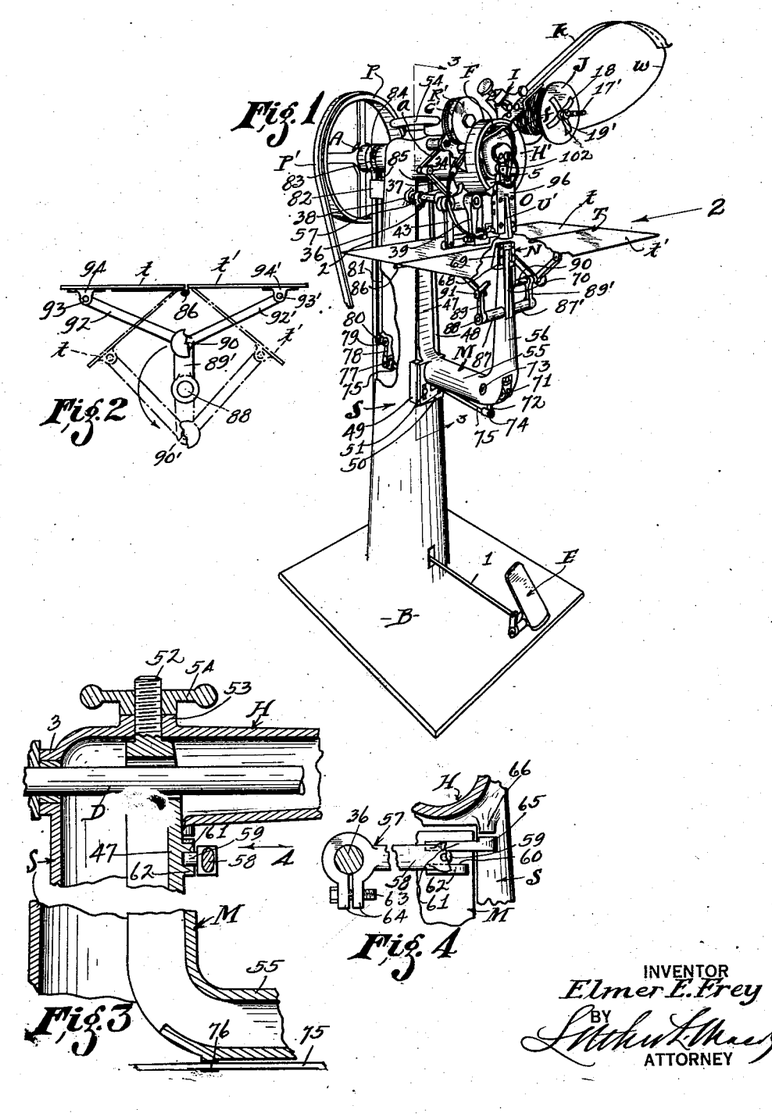
Fig. 1 is a perspective view of an assembled machine constructed in accordance with and embodying my improvements.
Fig. 2 is an end elevation of the stapling table, shown in full lines occupying a horizontal plane, and in broken lines with the hinged leaves thereof disposed at angles with respect to each other.
Fig. 3 is a fragmentary sectional elevation, on line 3—3 of Fig. 1, of the upper portion of the supporting standard with the clinching device support adjustably held thereon.
Fig. 4 is a front elevation of a part of the same.

I have shown in Fig. 1 an accredited form and design of standard S on which the operating mechanism is supported, for the reason that such a form of device lends itself conveniently to the necessities of stapling operations. Said standard has a base B and a head H integrally formed with the supporting column C, and rotatably carries in the head H a driving shaft D with a pulley P on the rear end thereof, arranged for operation by means of a belt P', or otherwise, adapted for connection with a motor or line shaft, not shown.

A suitable form of clutch A is provided on shaft D whereby said shaft is controlled in operation, for intermittently and at will applying power to the machine. The clutch A is operated by a pedal E oscillatably mounted on the front portion of base B and connected by means of rods 1 and 2, or other suitable means with said clutch. These connections are not material to my invention and any suitable clutch and operating means therefor may be employed in connection with my improvements.

Shaft D is suitably journaled at 3 in the rear portion of head H and at the front thereof in a suitable bearing formed on a partition 4 at the rear side of an enlargement H' integral with head H. Shaft D extends forwardly into a cam recess 5 in portion H' and carries an internal cam F having an irregularly formed slot $f$ in the front side thereof. Rearwardly of cam F, I provide a wire feed roller R which is fixed to shaft D and has its periphery 6 formed in registration with the pitch line of a gear G integrally formed on the rear portion of the roller.

On the rear side of portion H' of head H, I provide a cooperating roller R' and gears G' of the same size and character as roller R, which is driven by the meshing of gears G and G'. The roller R' is rotatably carried on an arm 7 by means of a bolt 8 secured to the central portion of said arm, while the outer end 9 of the arm is pivotally mounted on a lug 10 integrally formed on the head H and is held by means of a bolt 11 through said lug.

Figure 11:
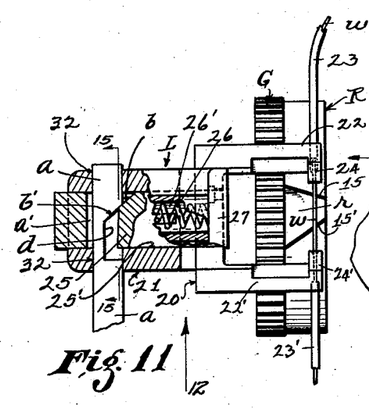
Fig. 11 is a sectional plan, on line 11—11 of Fig. 12, of the adjustable wire feeding mechanism showing a wire in feeding position therein.
Figure 13:
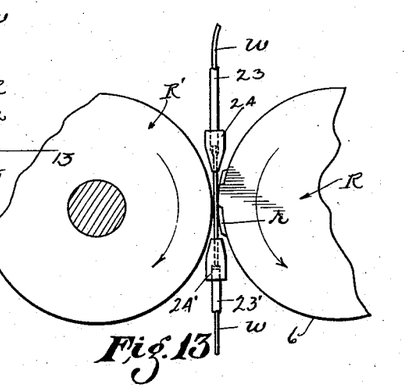
Fig. 13 is a front elevation, or face view, of the wire feeding rollers with a wire in feeding position therebetween.
Figure 14:
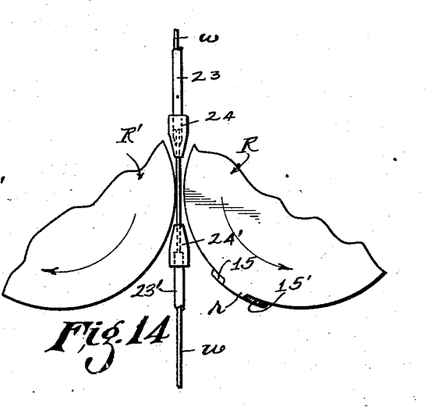
Fig. 14 is a similar view of the same with a wire inoperatively held in readiness for a feeding operation.
Figure 15:
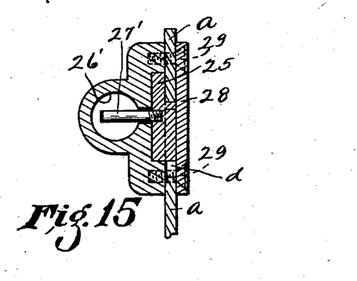
Fig. 15 is a transverse section of the wire feed adjustment head as seen on lines 15—15 of Figs. 11 and 12.

The rollers R and R' are held in operative engagement by means of a tension spring 12 connected with the free end 13 of the arm, and at its other end by suitable means to the rear portion of the head H'. Roller R, as shown in Figs. 11, 13 and 14 has an arcuate enlargement $r$ formed on the periphery thereof, and co-incident with the pitch line of the gears G and G'. The edges 15 and 15' of said enlargement are tapered as shown in Fig. 11, so as to provide an adjustable feed for the stapling wire W which is held between said rollers, as hereinafter described.

Figure 40:
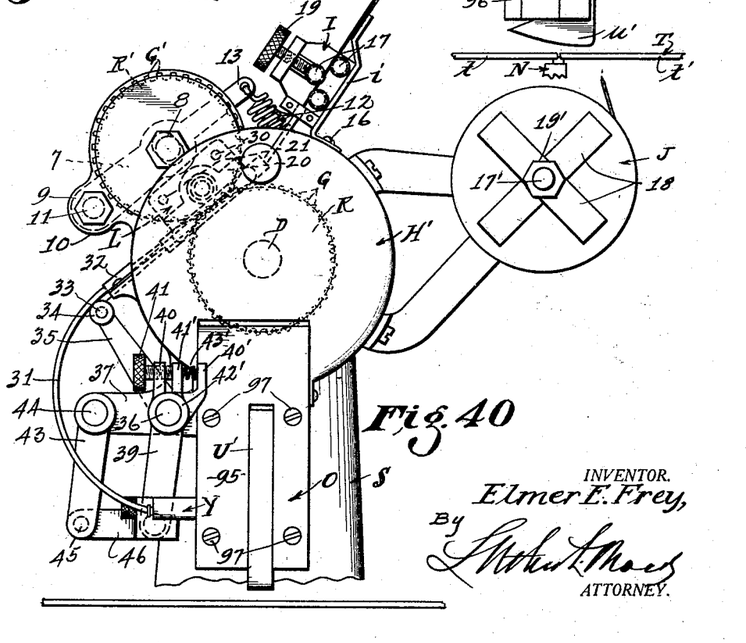
Fig. 40 is a front elevation of the same.

The wire is carried on a straightener I attached to a bracket $i$ which is secured by means of one or more screws 16 to the periphery of the head portion H', as seen in Fig. 40. Said straightener includes a plurality of annularly grooved rollers 17, 17, etc., arranged as shown in Fig. 40 to receive the wire W therebetween, a supply of said wire being carried on a reel J rotatably mounted on a spindle 17'.

The reel J is held against excessive rotation by means of a friction spider 18 which is adjustable on the spindle 17' by means of nuts 19'. The wire W is fed from the reel J outwardly and over a curved and inclined guide-way K, downwardly between the rollers 17 in the bracket I. The central roller 17 is adjustable by means of a set screw 19 in the bracket I with respect to the other of said rollers. The wire from the straightener I is fed downwardly through a wire feed adjustment device L, as shown in Fig. 11 and between the rollers R and R'.

Said adjustment device is attached to the rear of the housing portion H' centrally between the rollers R and R', and includes a slide 20 which is mounted on a fixed base 21. Said slide has a bifurcated forward portion overlying the roller R, with the furcations 22 and 22' spaced equidistant on opposite sides of the center of said roller.

The forward ends of the furcations 22 and 22' are pierced transversely to receive and hold the ends of wire carrying tubes 23 and 23', respectively, for guiding the wire through the arms 22 and 22' and between the peripheries of the rollers R and R'. Said tubes 23 and 23' terminate in sleeves 24 and 24' having beveled inner ends, and the outer ends of which engage the inner faces of the arms 22 and 22', respectively.

The slide 20 has a reduced portion 25 which is slidably held in a guide-way 25' formed in the supporting member 21, and a compression spring 26 is carried in a recess 26' of the body 21 which is adapted to compress against a pin 27' which is carried in the portion 25 of the slide 20 and projects into the recess 26'. Thus as the slide 20 is moved longitudinally, as seen in Fig. 11, the portion of the wire W between the sleeves 24 and 24' will move longitudinally over the peripheries of the rollers R and R'.

Figure 12:
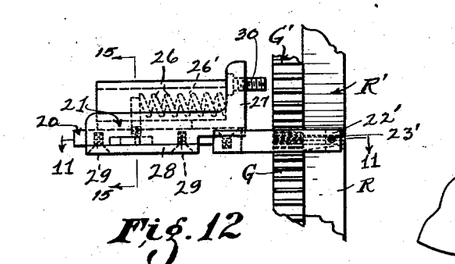
Fig. 12 is a side elevation thereof.

The slide 20 is held in the member 21 by means of a plate 28 attached to the bottom by means of screws 29, 29, as seen in Fig. 12.

The wire adjustment device L is bodily supported on the back of the portion H' of the housing by means of a pair or more screws 30 extending through the portion 27 of member 21. The wire is conducted downwardly and inwardly to the former through a bent tube 31 suitably attached to the head H at 32, and connected as hereinafter described with the cutter mechanism Y.

The device L, as hereinafter described in detail, is adapted for automatic adjustment simultaneously with other elements of the machine, to accommodate different thicknesses of books, and for this purpose I provide a bar $a$ which is transversely slidable in the base 21 of the device L in guide-ways 32, 32, while the outer end thereof is pivotally connected at 33 to a boss 34 on an arm 35 which is carried on a transverse shaft 36 extending rearwardly from the front of the machine through a lug 37.

The bar $a$ operates through the transverse slot $a'$ in the portion 25 of the slide 20, and the forward side of said slot $a'$ is beveled at $b$ for engagement with a correspondingly beveled portion $b'$ at one end of a notch $d$ in the bar $a$. The members 20 and $a$ provide for the longitudinal adjustment of the slide 20 in the block 21 when the bar $a$ is moved transversely. When the bar $a$ is moved inwardly in the block 21 to a maximum extent the slide 20 will seat in the notch $d$ of the bar, and set the device L for a maximum length of wire feed, while the adjustment of the slide 20 to the right as seen in Fig. 11, by sliding the bar $a$ transversely will decrease the length of the wire feed at each operation, corresponding to the movement of the member $a$. The minimum length of wire fed in an operation is established by the contact of the forward side of slot $a'$ in the slide 20 with the forward edge of bar $a$.

Shaft 36 is journaled on the upper part of the column S in a bearing 38, and the end thereof forwardly of the lug 37 loosely carries a depending arm 39 which has a pair of upwardly extending spaced lugs 40 and 40' with an adjusting screw 41 threaded through the lug 40 and engaging at its inner end a lug 41' formed on a collar 42' fixed to the shaft 36. A compression spring 43' is held between the lugs 40' and 41' for normally holding the screw 41 in contact with the lug 41' for adjusting the cutting mechanism Y, as hereinafter described.

Lug 37 carries a depending arm 43 pivoted at 44 to the outer end of said lug, and also pivotally connected at its lower end 45 with an extension 46 associated with the cutting mechanism Y for varying the length of the wire and the position of the cutter to correspond to the thickness of the books to be stapled in the machine.

It will be noted by reference to Figs. 1, 3, 4 and 40 that the standard S has a clincher head support M with a vertical portion 47 vertically slidable in a slot 48 formed in the front of the standard S, and also guided on a pad 49 on which a portion 50 of the member M is adjustably held by means of screws 51, 51.

The upper end of the member M has a threaded stem 52 which extends through a correspondingly threaded boss 53 in the head H, and carries a hand-wheel 54 by means of which the member M may be raised and lowered on the column S. Member M has a horizontal portion 55 and a vertical portion 56 underlying the forming head and adapted to support at its upper end a clinching mechanism N, to be hereinafter described in detail.

The shaft 36 carries a lever 57 with a horizontally disposed arm 58 having a roller 59 which engages a groove 60 formed between ribs 61 and 62 on the front face of portion 47 of member M. Member 57 is clamped on shaft 36 by means of a screw 63 extending through lugs 64, 64.

The upper rib 61 on member M has a boss 65 which extends outwardly from member M and beneath a corresponding boss 66 formed on the standard S, bosses 65 and 66 constituting a gauge between which a book is adapted to be placed while the member M is adjusted vertically on the standard S, for indicating the proper operating positions of the clinching head N and the forming and driving head O.

It will be apparent that the movement of the member M will cause a pivotal movement of the arm 57 and shaft 36 as the bosses 65 and 66 are spread apart or moved in the direction of each other, and the corresponding movement of shaft 36 will effect a rocking movement of arm 35 which is connected with the wire adjustment devices L and the arms 39 and 43 which are connected with the forming head O. Thus the adjustment of the member M at the same time and to a corresponding extent establishes the feeding relation of the rollers R and R', the proper elevation of the clinching head N and the movement of the cutter and the length of wire to be cut thereby, as will more clearly hereinafter appear.

Figures 16, 17, 18, 19, 20, 21, 21A, 21B, 22, 23:
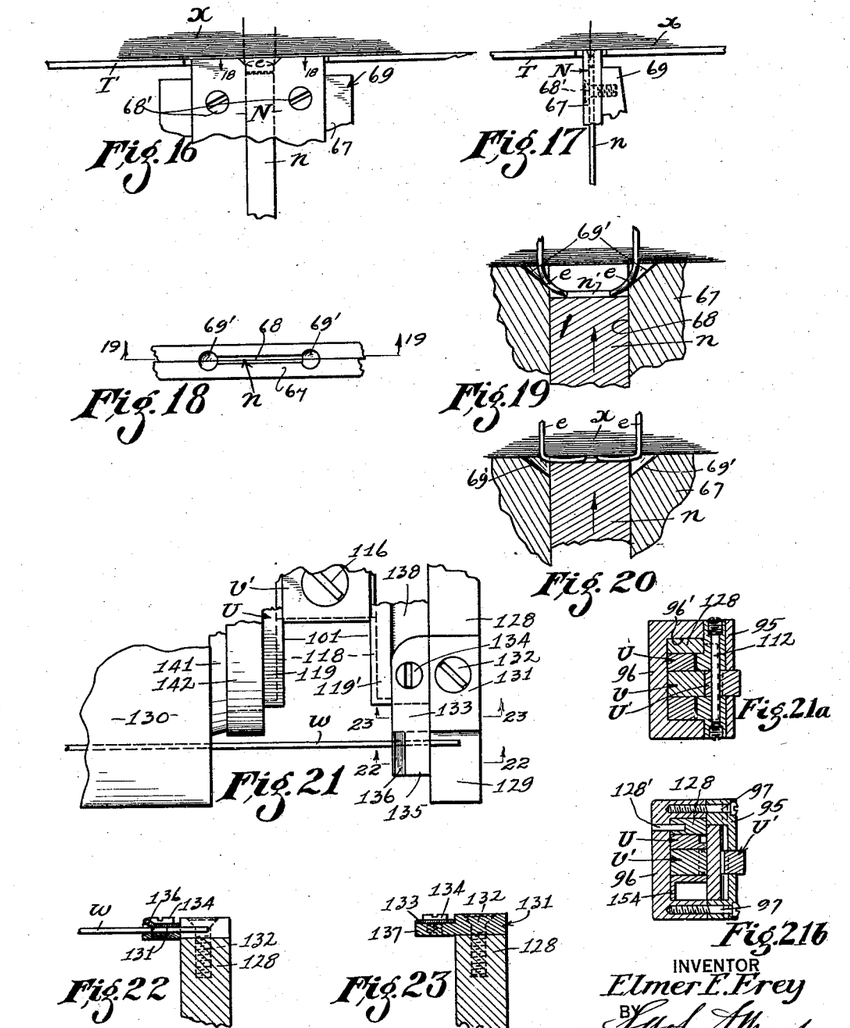

The clinching head N comprises a block 67 having a groove 68 vertically disposed therein in which a clincher blade n is movably held. The block is removably held on the upper end portion 69 of member M by means of screws 68' as seen in Figs. 16 and 17. The clincher n is connected by means of a rod 70 at a point 71 with a bell crank 72 which is pivoted at 73 in the forward portion of the adjustable member M.

Said bell crank has a depending arm which is pivotally connected at 74 with a horizontal rod 75 extending rearwardly under the portion 55 of member M and guided in a lug 76 depending therefrom. Rod 75 is pivotally connected at 77 with the bell crank 78 which is pivotally mounted at 79 within the standard S. Said bell crank has its other arm pivotally connected at 80 with a vertical rod 81 rearwardly of the column S and guided in a lug 82 on the rear side of said column.

Fixed to the drive shaft D between the clutch A and the column S, I provide a cam 83 which has a peripheral enlargement 84 thereon adapted to engage the upper end 85 of rod 81, so that when the cam is rotated the portion 84 will depress said rod 81, and through the connection described elevate the rod 70 and the clincher n, for the purpose of clinching the staples which have been previously driven through the book or matter indicated in Figs. 16 and 17.

The block 67 of the clincher N has oppositely beveled portions 69', 69' formed in the upper side thereof and communicating with the groove 68 in which the clincher operates, while the clincher is provided with a horizontal groove n' on the upper end thereof in registration with the beveled portions for receiving the ends e, e of the staples as shown in Figs. 19 and 20, whereby the ends of said staples may be clinched on the matter X at the completion of a driving operation.

The front arm 56 of member M is arranged to adjustably support a table T composed of a pair of leaves t and t' hingedly connected at a plurality of points 86 at their inner edges, the axis of said table being alined with the clincher n. The opposite sides of portion 56 of member M are provided with alined bosses 87 and 87' in which is carried a shaft 88 having fixed thereto at its opposite ends arms 89 and 89'. The upper edges of said arms are pivotally connected at 90 and 91 with a pair of diagonally disposed arms 92 and 92' which are pivotally attached at their upper ends at points 93 and 93' to depending lugs 94 and 94', respectively from leaves t and t'.

The pivot pin 90 is slidable in the arm 89' and is adapted to selectively seat in a pair of perforations above and below the shaft 88 in the portion 56 of member M for holding the table T in either of the two positions shown in Fig. 2.

When it is desired to dispose the table as shown in broken lines in said figure, the pin 90 is withdrawn from its seat in the portion 56 and the arms 89 and 89' are turned on their axes 88, until the pin occupies the position as at 90' below the shaft 88, where it may seat in a perforation in the portion 56 and hold the table leaves t and t' disposed at substantial angles with respect to each other, as shown. This adjustment is desirable for adapting the machine to different kinds of stapling operations.

Where a plurality of sheets are stapled together at corresponding edges the horizontal table is employed, and where the sheets are stapled in the center at points intermediate their edges, which operation is known in the trade as "saddle stitching", the table T is disposed as indicated by broken lines in Fig. 2, with the leaves t and t' at angles with respect to each other.

The forming and driving head O includes formers U and U', a driver V, and a cutter Y, mounted in operative relation as a unit. Said head includes a supporting block 95 stationarily held on a depending portion 96 of the head H' by means of screws 97, 97, etc.

Figure 24:
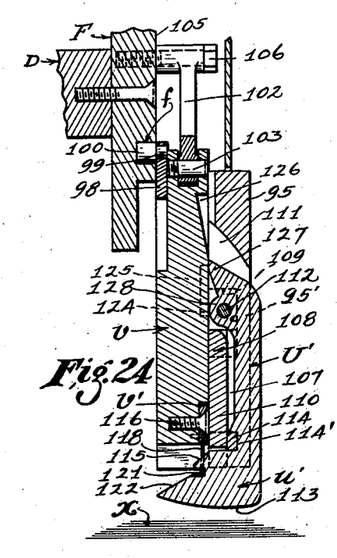
Figs. 24, 25 and 26, are, respectively, sectional elevations of the driving and forming units, showing different positions thereof.
Figure 25:
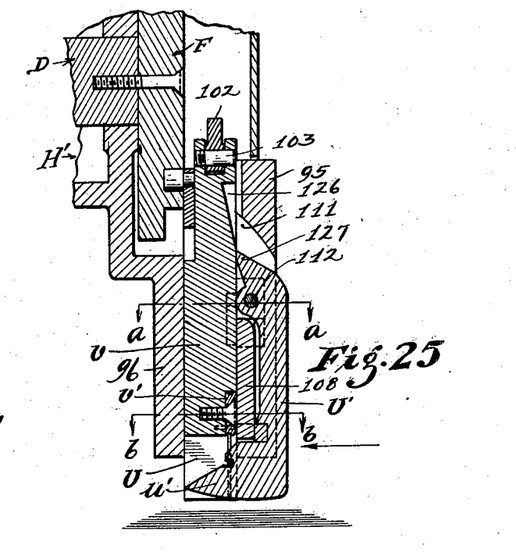
Figures 26, 27, 28, 29, 30, 31, 32:
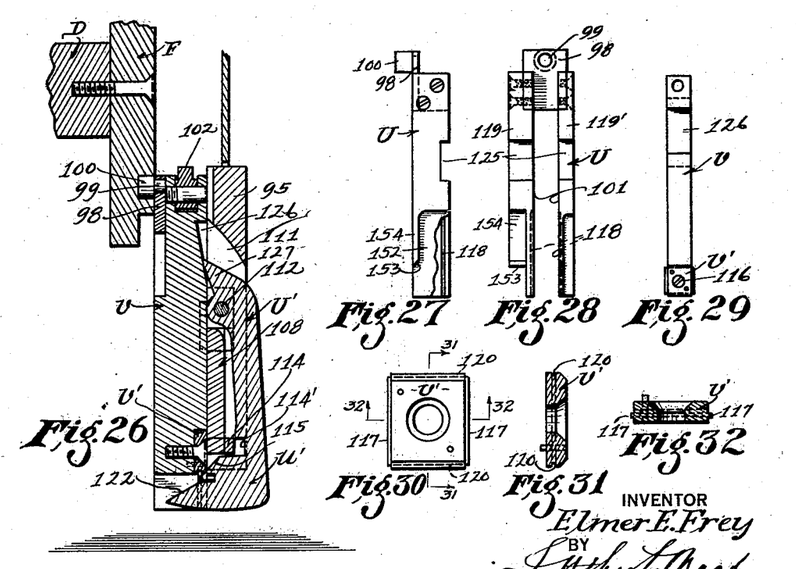
Figs. 27 and 28 are side and face views, respectively, of one of the forming members.
Fig. 29 is a face view of the driver body.
Fig. 30 is a face view of the driver plate.
Figs. 31 and 32 are, respectively, sections thereof on lines 31—31 and 32, 32 thereof.

The portion 96 of the frame has a vertical groove of rectangular cross section, as at 96' to slidably receive a vertically reciprocable forming element U, which cooperates with a pivotally mounted cooperating forming element U', as shown in Figs. 24 and 26. The member U is provided at its upper end with a plate 98 carrying a pin 99 on which is mounted a roller 100 which engages the cam slot $f$ in the cam F, for reciprocating the member U during the operation of said cam.

The member U is provided with a vertical guideway 101 in which the driver V is reciprocably mounted. Said driver is pivotally connected at its upper end with a connecting rod 102 by means of a pin 103, and said connecting rod is connected at 104 with the central portion 105 of cam F by means of a screw 106. Thus the members U and V are differentially reciprocated during the operation of the cam F.

The block 95 is provided intermediate its ends with a horizontal groove 95′ which communicates with a vertical groove 107 adapted to movably support a slide 108, said slide having lateral portions 109, 109 movable in the horizontal grooves 95′ and a vertical portion 110 movable in the groove 107. The block 95 is provided with an elongated aperture 111 through which a forming element U′ projects and in which said member is vertically reciprocable.

The member U′ is pivotally mounted at 112 on the upper portion of the slide 108 and is provided at its lower end with a forming head $u'$, having the lower end 113 thereof arcuately formed substantially above the axis 112. The block 95 carries a transversely held bar 114 of rectangular cross section which is adapted to normally seat in a notch 114′ formed on the inner side of the forming member U′ for preventing the movement of the slide 108 and the former U′ downwardly while the staples are being cut and formed.

Member U′ has a beveled inner portion 115 extending inwardly from the inner side of the slide 108 and adapted to be engaged by the lower end 115′ of the driver blade V′ subsequent to a staple forming operation, the engagement of which members serves to move the member U′ out of engagement with the bar 114 to permit the subsequent movement of the slide 108 and member U′ downwardly in the direction of and for contact with the paper X to be stapled.

The driver V has a hardened blade V′ attached to the inner side thereof by means of a screw 116. Said blade is provided with laterally formed tongues 117, 117 for engagement with vertical grooves 118, 118 formed in the opposite portions 119 and 119′ of the member U. The member V′ may be provided with horizontal grooves 120 on its upper and lower faces for engagement with and for holding the central portions of the staples formed by the members U and U′. The double grooving of the blade V′ renders the blade interchangeable in the member V.

The wire is fed into the head O at a point beneath the lower end of the block 95, as shown in Fig. 24, and the forming member U′ is provided with a transverse groove 121 through which the wire is moved in a feeding operation for disposing the wire for a staple to be formed centrally over the member U′. With the member U′ in the position shown in Fig. 26, the forming operation has just been completed by the movement of the member U downwardly to a maximum extent on the block 95, the portions 119 and 119′ of member U having bent the ends of the staples downwardly over the sides of the central forming member U′.

Following this operation the former U having receded outwardly from engagement with the bar 114, the wire W having been cut and formed into a staple is driven downwardly through the paper X and over the beveled end portion 122 of member U′, so that the ends $e$, $e$ of the staples will pierce the paper X and be deflected inwardly over the beveled portion 69′ in the clincher blocks 67. As the staples are formed, as shown in Fig. 19, the clincher $n$ moves upwardly and bends the curved end portions $e$, $e$, of the staples upwardly into the final position shown in Fig. 19.

An important feature of the mechanism is to slightly curve the ends of the staples after they have pierced the paper, so that at the completion of an operation, as shown in Fig. 20, the extremities of the staples will be bent inwardly against the paper X instead of at slight angles therefrom, as usual with other machines where other means for this purpose is employed. This operation provides neater stapling than would otherwise be possible.

The movement of the slide 108 is limited by the opposite ends of the groove 95′ in which the slide is operated, and the movement of the member U′ upwardly and downwardly is limited by means of a pair of horizontally alined ribs 124 formed on the inner side of the slide 108 and engaging grooves 125 formed on the outer face of the member U.

It will be noted by reference to Fig. 24 that the driver V has a beveled notch 126 formed in the front face thereof, which is adapted to engage an angular end portion 127 formed on the member U′ above its axis 112. In the position shown in Fig. 24 the vertical face of the member V is engaged by the portion 127 and also by the portion 128 of member U′, which serves to hold the member U′ normally in the position shown in Fig. 24 and against pivotal movement on its axis. As the member V, however, moves downwardly with respect to the member U′, the angular portion 127 will engage the beveled portion 126 of member V and thus permit an outward movement of the member U′ on its axis, so as to move the forming head $u'$ of member U′ thereof outwardly from beneath the wire W during a stapling operation. The movement of member U′ for such purpose is effected by the engageemnt of the lower end 115′ of member V with the beveled portion 122 of member U′.

The member U′ is restored to the normal position shown in Fig. 24 by the sliding engagement of the member V therewith as said member V moves upwardly.

Although the members U and U' are independently operated for effecting the forming and driving operations, in succession, said members are commonly operated for restoration to normal position by the upward movement of the cam F through the connection of said members, as described. The lower end of the slot 125 in the member U engages the rib 124 on the slide 108 and moves said slide together with the former which is carried thereon upwardly to its maximum elevation and normal position.

On the opposite side of the head O from the cutter I provide a stationarily held gib 128 in the frame 96 secured by a pin 128' and adjacent the member U. Said member is cut away at 129 so that the wire W will overlie the portion 129 when it is fed under the driver V and through the cutter block 130.

The member 129 carries a plate 131 attached thereto by means of a screw 132 above the portion 129 thereof, to which is attached a flat spring 133 by means of a screw 134. Said spring has a depending portion 135 with an outwardly beveled portion 136 overlying the portion 137 of the plate 131. The portion 135 of the spring is resilient so that the wire W when fed between the portion 135 of the spring and the portion 137 of said plate will be frictionally supported in position during and subsequent to the cutting operation, and until engaged by the forming members U and U' for forming the cut sections of wire into staples.

This device is important in that it serves as a retainer for the sections of wire W and prevents the accidental dropping thereof from forming position before they are gripped and held by the forming members U and U'. The member U is cut away at 138 on one side to slidably engage the portion 137 of plate 131 which is carried on the gib 128.

Figure 5:
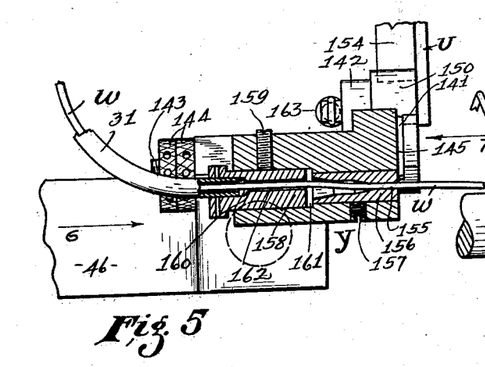
Fig. 5 is a sectional elevation on line 5—5 of Fig. 6, showing the cutter head with a wire in position for cutting.
Figure 6:
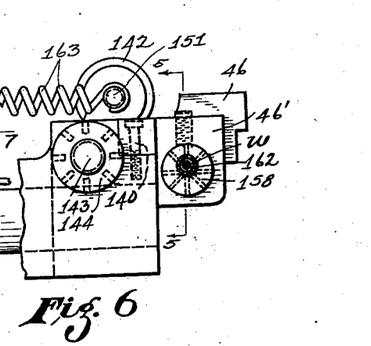
Fig. 6 is a side elevation of the same.

The cutter head Y includes the block 46 which is suspended on the arms 39 and 43, shown in Fig. 40, and a detachable block 46' secured thereto by means of one or more screws 140, as shown in Fig. 6. The cutter block 46 pivotaly carries a rotary cutter 141 which is mounted on an arm 142 carried on a pin 143 which extends through the block 46'. The pin 143 is fixed to the arm 142 at its inner end and is provided on its outer end with a pair of lock nuts 144 by means of which the cutter 141 may be adjusted relative to the inner end 145 of block 46', through which the wire W is fed, as shown in Fig. 5.

The cutter 141 has a beveled edge 146 which movably engages the end 145 of block 46' and is also provided with a hub 147 which is pivotally held in the portion 148 of arm 142. Said arm has an upwardly extending portion 149 which pivotally carries a roller 150 on a pin or screw 151. The roller 150 is positioned adjacent a recess 152 in the side of the forming member U, and is adapted to engage the lower beveled end 153 of a rib 154 formed on said member U, so that as the member U moves downwardly the beveled edge 153 thereof will engage the roller 150 and move the cutter 141 downwardly over the inner end of passage 155 through which the wire W is extended. Said passage is centrally formed in a hardened steel bushing 156 held in the lower portion of block 46' by means of a set screw 157, or otherwise. At the outer end of the bushing 156 I provide a larger bushing 158, similarly held by a set screw 159 and having an eccentrically formed passage 160 therein, in which is held by suitable means the lower end of the wire feed tube 31.

The bushing 158 is rotatably adjustable in a counter bore 161 in the block 46', for the purpose of varying the relations of the wire passage 162 therein with respect to the passage 155 in the bushing 156, so as to incline the wire W at the end of the cutter to a desired extent, upwardly or downwardly for proper engagement with the retainer 136 in the form the spring 133 shown in Fig. 21.

Figures 7, 8:
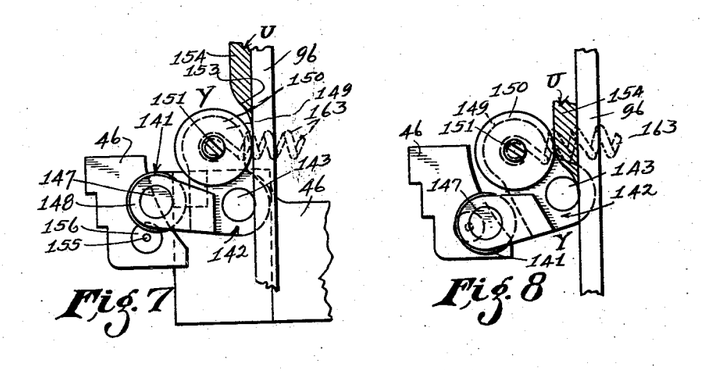
Figs. 7 and 8 are enlarged elevations, on transverse planes, of the wire cutter, respectively, prior to and after a cutting operation.
Figure 9:
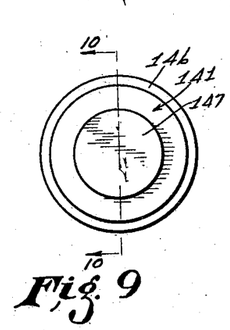
Fig. 9 is an enlarged face view of the cutter roller.
Figure 10:
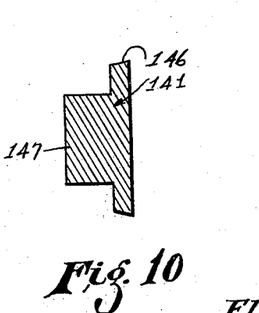
Fig. 10 is a section of the same on line 10—10 of Fig. 9.

The cutter 141 is normally held upwardly in the position shown in Fig. 7 by means of a spring 163 attached at one end to the screw 151 of the arm 142, and at its other end attached to the lower portion of arm 39, which movably supports the cutter block in conjunction with the arm 43.

Figure 39:
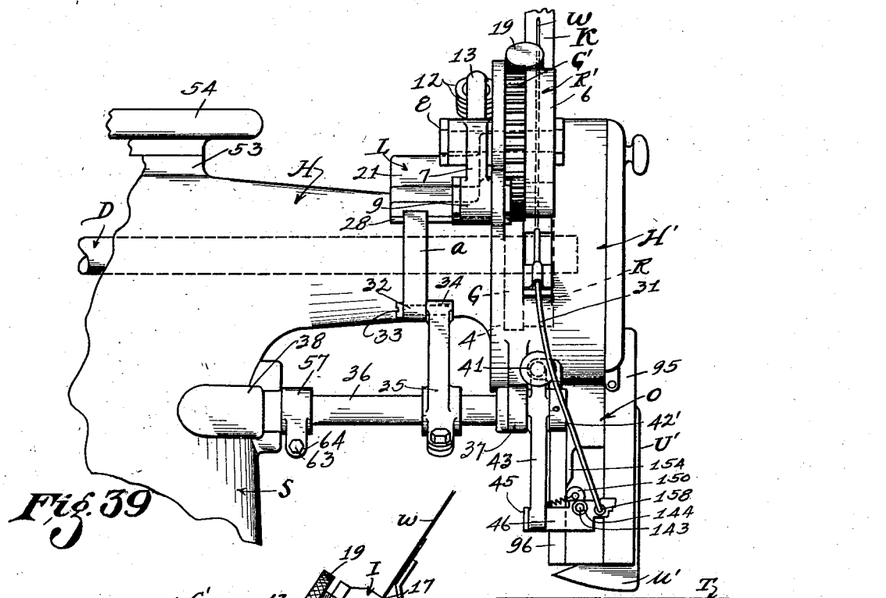
Fig. 39 is a fragmentary elevation of the upper portion of the machine as seen from a side thereof.

Referring to Fig. 21 it will be noted that the gib 128 is spaced to the right from the forming member U for a substantial distance, and the wire feed mechanism shown in Figs. 39 and 40 may be adjusted so that the ends of the portions of wire cut for the staples may be extended on opposite sides of the member U for equal distances, so that the ends e, e, of the staples will be substantially of the same length.

In operation, when a reel of wire as at J is properly positioned on the machine, as shown in Fig. 40, and is threaded over the guide K between the rollers 17 of the straightener, between the rollers R and R' and through the tube 31 downwardly to and through the cutter block 130. The machine may be adjusted simultanenously in a single operation for stapling matter of a given thickness, as hereinbefore described.

The table T on which the matter is held in a stapling operation may be adjusted as shown in Figs. 1 and 2 with the leaves horizontally or angularly disposed, depending upon the character of the matter to be stapled. Thereafter when power is applied to the driving pulley P, said pulley will operate on the drive shaft D without communicating power to the machine until the pedal E is operated for communicating power intermittently to said drive shaft.

The wire feeding rollers R and R' having previously fed a length of wire into stapling position below the forming and driving head, the initial downward movement of the forming member U through the engagement of the portion 154 thereof with the roller 150 on the cutter, effects the operation of the cutter 141 for cutting the wire W at the inner end of the bushing 156.

Immediately following the cutting operation, the continued movement of the forming member U downwardly serves to form the cut section of wire in the grooves 118, 118 of member U, and over the forming head u' of the pivoted forming member U'. At the completion of the forming operation the driver V moves downwardly and the lower edge 115' of blade V' thereon engages the beveled portion 115 on the member U', causing the member U' to recede from position shown in Fig. 24 until a position shown in Fig. 26 is attained. Following this the central portion of the staples are guided downwardly over the beveled portion 122 of member U', while the end e, e, of the staples are guided downwardly through the slots 118 in member U. The central portions of the staples while they are so moved are held in the grooves 120 of member V'. Thus the engagement of the driver with the staples forces the ends e, e, through the matter X to be stapled, and the lower ends are bent inwardly by reason of their engagement with the beveled portion 69' in the clincher, as shown in Fig. 19. The ends of the staples are thereafter bent upwardly by the upward movement of the clincher into close engagement with the matter X, as shown in Fig. 20.

Figures 33, 34, 35, 36, 37, 38:
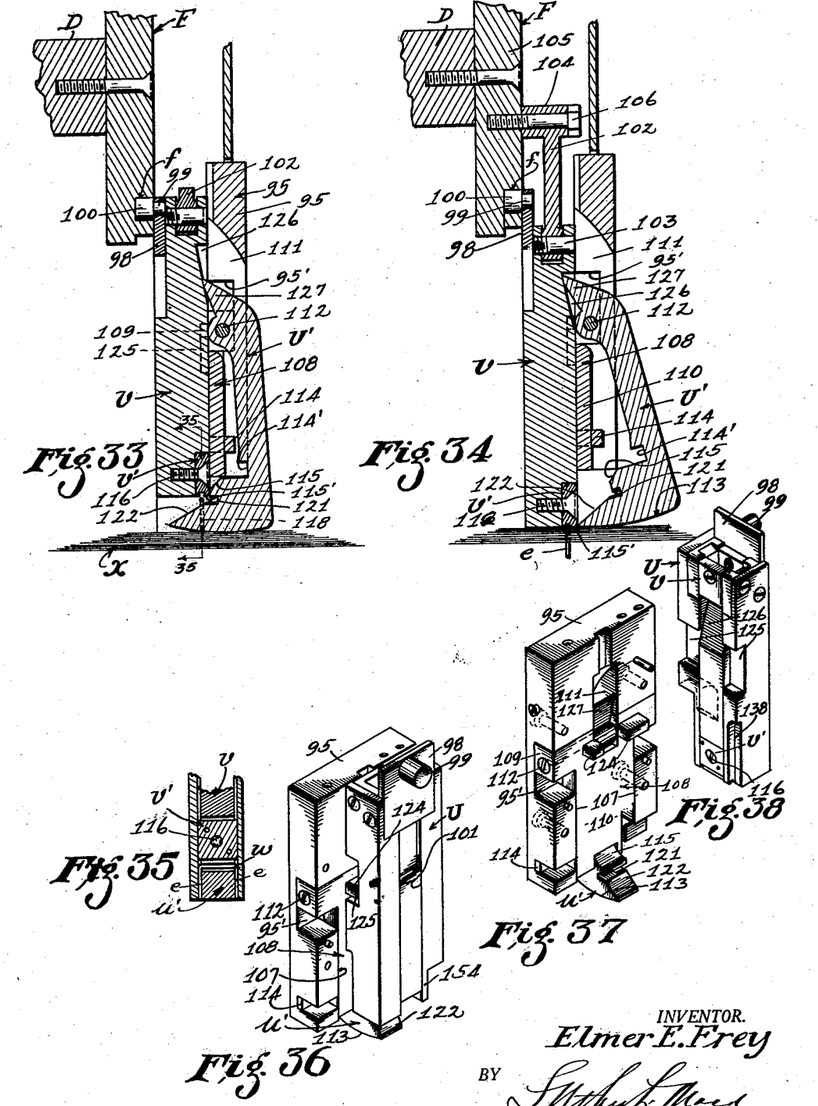
Figs. 33 and 34 are views of the forming and driving head, similar to Figs. 24, 25 and 26, showing the receding movement of the former preparatory to and during a driving operation, respectively.
Fig. 35 is a section of the same on line 35—35 of Fig. 33.
Fig. 36 is a perspective view of the side of the forming and driving units.
Fig. 37 is a perspective view of the same with certain parts omitted.
Fig. 38 is a perspective view of the former and driver apart from their supporting means.

Immediately following the release of the member U' from bar 114 by reason of the engagement of the driver blade V' with the portion 115, the slide 108 together with the member U' which is pivotally held thereon, moves downwardly into contact with the matter X to be stapled, and the engagement of the portion 115 of member V' with the beveled portion 122 of member U' causes said member U' to recede outwardly from below the driver and to the position shown in Fig. 34, so as to permit the application of sufficient pressure to the matter X and the staple to effect the driving of the ends e, e, of the staples through said matter and the clinching theerof, as shown in Fig. 20. As the member U' recedes from its position between the portions e, e, of the staple it serves as a support for the staple to prevent the buckling thereof and to insure the application of the full power of the member V to the staples in a driving operation.

Following the clinching operation the members 108, V and U' begin their movement upwardly for a succeeding operation and the member U' moves inwardly to normal position as the driver V moves upwardly by reason of the engagement of the portion 127 of member U with the portion 126 of member V.

During the driving and forming operations the slide 108 having moved downwardly, together with the member U', which is pivotally held thereon, the upward movement of the members U and V will effect the restoration of the slide 108 and member U' by means of the engagement of the lower ends of the groove 125 on member U with the ribs 124 on the slide 108.

In the restoration of said members as described, when the members U and V' have reached a position in their upward travel above the wire feeding passage 155, the rollers R and R' become operative for initiating the feeding of a succeeding portion of wire through said passage into the position shown in Fig. 21, preparatory to another operation. The feeding operation is accomplished in the manner hereinbefore described, and is entirely completed before the members U and V' become operative for a succeeding operation.

In this manner when any operation of the machine is initiated by applying power to the driving shaft D, as described, a section of wire W will be positioned beneath the forming and driving members for effecting a subsequent stapling operation.

What I claim is:

1. A stapling machine comprising a forming and driving head, a clinching head, means for successively feeding portions of wire to stapling position therebetween, a freely rotatable cutter mounted adjacent said forming and driving head for cutting uniform lengths of said wire preparatory to each operation of the machine, and means for oscillating said cutter bodily to and from operative engagement with the wire.

2. A stapling machine embodying cooperating forming, driving and clinching elements, means for feeding wire to operative position with respect thereto, a freely rotatable cutter for engagement at its periphery with and for cutting said wire into sections of uniform length at the beginning of each operation, and means for swinging said cutter to and from operative position.

3. A stapling machine embodying cooperating forming, driving and clinching elements, means for feeding wire to operative position with respect thereto, a rotary cutter having an annular cutting edge for peripheral engagement with and for cutting said wire into sections of uniform length at the beginning of each operation, means for swinging the cutter to and from operative position and means for simultaneously adjusting said forming, driving, clinching and cutting means for providing staples of different size to correspond to the thickness of matter to be stapled.

4. A stapling machine comprising means for forming and driving staples, means for operably supporting wire for forming said staples, and continuously rotatable means for feeding wire to said stapling mechanism and adjustable transversely of the wire for providing sections of wire of different length, to correspond to different thicknesses of matter to be stapled.

5. A stapling machine of the character described comprising a stapling mechanism, means for supporting a quantity of wire to be fed at intervals thereto for forming the staples, a pair of cooperating rotary feed members engaging the opposite portions of the wire and having intermittently operable means for feeding uniform sections of said wire to said stapling mechanism, and means adjustable to the thickness of the matter to be stapled and operatively connected with said wire for moving the same relative to said feed members, for varying the length of wire fed at each operation in accordance with the thickness of the matter to be stapled.

6. A stapling machine including differentially operated forming and driving means, means for feeding wire thereto in a stapling operation, a freely rotatable cutter bodily movable about an axis eccentric to that of the wire supported adjacent said forming and driving means, and adjustable relative thereto, and means operatively connecting said cutter and said wire feeding means for adjusting the cutter with respect to said forming and driving means to an extent corresponding to the length of wire fed at each operation by said feeding means.

7. A stapling machine comprising a staple forming and driving mechanism, a clinching mechanism adjustable with respect thereto for accommodating matter of varying thickness, a wire feeding mechanism transversely adjustable relative to the wire, a cutting mechanism operably connected with said stapling mechanism, and means connected therewith for simultaneously adjusting said wire feeding mechanism, said cutting mechanism and said clinching mechanism to a common extent to correspond to the thickness of the matter to be stapled.

8. A stapling machine comprising a staple forming and driving mechanism, a clinching mechanism adjustable with respect thereto for accommodating matter of varying thickness, a wire feeding mechanism transversely adjustable relative to the wire, a cutting mechanism operably connected with said stapling mechanism, and means connected therewith for simultaneously adjusting said wire feeding mechanism, said cutting mechanism and said clinching mechanism to a common extent to correspond to the thickness of the matter to be stapled, said adjustment being effected by the adjustment of the clinching mechanism.

9. A book stapling machine comprising a standard, wire forming means and staple clinching means supported on said standard and adjustable one relative to the other, a supporting member for the clinching means, a table on said suppporting member comprising a pair of leaves hinged together at their inner ends, arms pivotally supported on said supporting member, and links connecting said arms with the outer portions of said leaves whereby the rotation of said arms will position said leaves in a common plane or in relatively angular planes corresponding to the character of the work to be stapled.

10. In a stapling machine including a rotary driving head, wire forming and driving members operably mounted in a fixed position with respect to said head and connected therewith, means for feeding wire to said forming and driving head transversely adjustable to the wire for varying the length of wire supplied at each stapling operation, and a wire cutter adjustable in position with respect to said forming and driving members.

11. In a stapling machine including a rotary driving head, wire forming and driving members operably mounted in a fixed position with respect to said head and connected therewith, means for feeding wire to said forming and driving head transversely adjustable to the wire for varying the length of wire supplied at each stapling operation, a wire cutter adjustable in position with respect to said forming and driving members, and means operably connecting said cutting mechanism with said feed mechanism for adjusting the feed mechanism to an extent corresponding to the adjusting of the cutting mechanism.

ELMER E. FREY.